(12) United States Patent
Chen et al.

(10) Patent No.: US 12,362,644 B2
(45) Date of Patent: Jul. 15, 2025

(54) LINEAR MOTOR MODULE

(71) Applicant: YALONG INTELLIGENT EQUIPMENT GROUP CO., LTD., Wenzhou (CN)

(72) Inventors: Chuanzhou Chen, Wenzhou (CN); Iurii Gaidaienko, Wenzhou (CN); Yong Wang, Wenzhou (CN); Fengjuan Duan, Wenzhou (CN); Kai Chen, Wenzhou (CN)

(73) Assignee: YALONG INTELLIGENT EQUIPMENT GROUP CO., LTD., Wenzhou (CN)

( * ) Notice: Subject to any disclaimer, the term of this patent is extended or adjusted under 35 U.S.C. 154(b) by 0 days.

(21) Appl. No.: 18/251,970

(22) PCT Filed: Nov. 17, 2022

(86) PCT No.: PCT/CN2022/132549
§ 371 (c)(1),
(2) Date: May 5, 2023

(87) PCT Pub. No.: WO2023/179060
PCT Pub. Date: Sep. 28, 2023

(65) Prior Publication Data
US 2025/0015696 A1 Jan. 9, 2025

(30) Foreign Application Priority Data
Mar. 24, 2022 (CN) .......................... 202210293281.9

(51) Int. Cl.
*H02K 41/02* (2006.01)
*H02K 1/17* (2006.01)
(52) U.S. Cl.
CPC ............... *H02K 41/02* (2013.01); *H02K 1/17* (2013.01); *H02K 2213/03* (2013.01)

(58) Field of Classification Search
CPC ...... H02K 41/02; H02K 1/17; H02K 2213/03; H02K 41/03; H02K 41/00
(Continued)

(56) References Cited

U.S. PATENT DOCUMENTS

2003/0102723 A1* 6/2003 Korenaga ........... G03F 7/70758
310/12.24
2003/0234584 A1* 12/2003 Miyata ................. H02K 41/031
310/12.01
(Continued)

FOREIGN PATENT DOCUMENTS

CN 103731005 A 4/2014
CN 207283380 A 4/2018
(Continued)

OTHER PUBLICATIONS

International search report of PCT/CN2022/132549.

*Primary Examiner* — Jose A Gonzalez Quinones
(74) *Attorney, Agent, or Firm* — Hemisphere Law, PLLC; Zhigang Ma

(57) ABSTRACT

The present disclosure discloses a linear motor module, including a mounting base, a magnet mounting seat arranged on the mounting base, three stators arranged on the magnet mounting seat and composed of array-structured permanent magnet assemblies, linear guide rails arranged on the mounting seat, sliding blocks mounted on the linear guide rails, a moving plate arranged on the sliding blocks, and three inductors arranged on the moving plate and corresponding to the stators. The magnet mounting seat has three mounting surfaces; the three stators are separately located on the three mounting surfaces; the three inductors are arranged in a one-to-one correspondence to the three stators; and an angle between two adjacent stators is 60 degrees. The linear motor module of the present disclosure is reasonable in structural design. The angle between two adjacent stators is 60
(Continued)

degrees, so that a normal attracting force between the stator and the inductor on each surface can be compensated for each other, and a vector sum of the normal attracting forces tends to be zero. Therefore, the normal attracting force caused therefrom and a load and friction loss on the linear guide rails can all be significantly reduced.

8 Claims, 4 Drawing Sheets

(58) Field of Classification Search
USPC .................................... 310/12.01, 12, 13
See application file for complete search history.

(56) References Cited

U.S. PATENT DOCUMENTS

| | | |
|---|---|---|
| 2012/0187779 A1 | 7/2012 | Lee |
| 2013/0154398 A1 | 6/2013 | Kim |
| 2014/0125172 A1 | 5/2014 | Hsieh |

FOREIGN PATENT DOCUMENTS

| | | | |
|---|---|---|---|
| CN | 108107734 A | | 6/2018 |
| CN | 114583916 | | 6/2022 |
| JP | H11178309 A | * | 7/1999 |
| JP | 2006006060 A | * | 1/2006 |

\* cited by examiner

LINEAR MOTOR MODULE

TECHNICAL FIELD

The present disclosure relates to the technical field of linear modules, more specifically to a linear motor module.

BACKGROUND

There are many linear modules in the automation industry. A traditional linear module is composed of a rotary motor, a guide rail, a ball screw, and a nut coupling or a nut seat. A working principle of the traditional linear module is to convert a rotation motion of the motor into a linear motion of a moving platform through the ball screw and the nut coupling. When the motor drives the ball screw to rotate, the nut seat slides on the screw and performs linear motion along the guide rail. Although the traditional linear module is widely used in such fields as intelligent manufacturing, industrial robots, precision machine tools, mechanical industries, intelligent automation and biotechnologies, and has good performance, the traditional linear module also has the following shortcomings: The accuracy is relatively low; the ball screw is expensive; the machining difficulty is high; a length of the ball screw is restricted; and it is also difficult for high-speed running.

If a linear motor is used for direct driving, intermediate links of a transmission chain such as a reducer, a lead screw, a belt and a gear rack are omitted, and the transmission accuracy and response speed of a system are improved. A linear module integrated with a linear motor is referred to as a linear motor module. At present, a large number of linear motor modules are used in the automation industry. A traditional linear motor module includes a permanent magnet array stator and a linear inductor. The linear inductor is mounted on a mover and slides along a guide rail. A working principle of the traditional linear motor module is that a magnetic field of the inductor of the linear motor interacts with a permanent magnet of the stator to provide a linear motion for the inductor of the linear motor, and a moving platform is directly driven to slide along the guide rail, without transmission. A linear motor is applied to industrial equipment, which improves the convenience of a machine tool. In recent years, it is particularly internationally popular to apply linear motors to numerically-controlled machine tools. The reason is that a traditional machine tool is driven by screws which also need to be driven. This has the following disadvantages: length limits, mechanical clearance, friction accuracy. Linear motors can achieve ultra-high accuracy, and have a speed that is 10 times, or more, higher than that of screw-nut linear modules. However, there are still some obvious disadvantages. For example: it is hard to mount permanent magnets on a mounting plate with high accuracy; iron-core linear motors have a relatively high normal force, which reduces the service life of a linear bearings, and have large trust variations causing the cogging effect and influencing the smooth operation.

SUMMARY

The present disclosure overcomes the shortcomings in the prior art, and provides a linear motor module, which can reduce a normal attracting force, reduce the weight of the linear motor module and reduce trust changes, can obtain a higher traction force, and does not affect the motion accuracy of the whole device.

In order to achieve the foregoing purpose, the present disclosure provides the following technical solution:

A linear motor module includes a mounting base, a magnet mounting seat arranged on the mounting base, three stators arranged on the magnet mounting seat and composed of array-structured permanent magnet assemblies, linear guide rails arranged on the mounting seat, sliding blocks mounted on the linear guide rails, a moving plate arranged on the sliding blocks, and three inductors arranged on the moving plate and corresponding to the stators. The magnet mounting seat has three mounting surfaces; the three stators are separately located on the three mounting surfaces; the three inductors are arranged in a one-to-one correspondence to the three stators; and an angle between two adjacent stators is 60 degrees.

Preferably, the magnet mounting seat is an inverted trapezoid or an inverted triangle or U-shaped, and the mounting base is provided with a supporting seat connected to the magnet mounting seat.

Preferably, the magnet mounting seat is internally hollow.

Preferably, each inductor includes an iron core and m phases of concentric windings. and m is an integer greater than or equal to 2.

Preferably, an encoder is arranged on the moving plate, and the mounting seat is provided with a magnetic scale of encoder opposite to the encoder.

Preferably, a supporting cover plate is arranged on the moving plate; an accommodating space is formed between the moving plate and the supporting cover plate; and a protective cover plate is arranged in the accommodating space.

Preferably, each array-structured permanent magnet assembly is composed of several segmented plates.

The present disclosure has the beneficial effects.

The linear motor module of the present disclosure is reasonable in structural design. The angle between two adjacent stators is 60 degrees, so that a normal attracting force between the stator and the inductor on each surface can be compensated for each other, and a vector sum of the normal attracting forces tends to be zero. Therefore, the normal attracting force and a load and friction loss on the linear guide rails can be significantly reduced.

Figure 1:
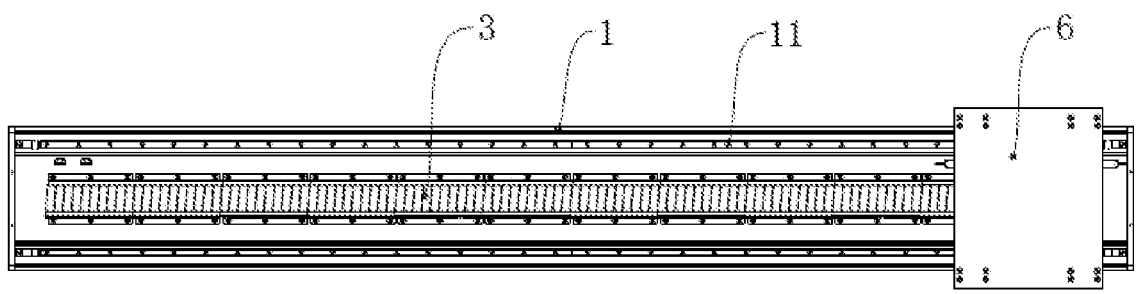
FIG. 1 is a structural schematic diagram I of a specific embodiment of the present disclosure.

In the drawings: 1: mounting base; 11: linear guide rail; 12: sliding block; 13: supporting seat; 14: magnetic scale of encoder; 2: magnet mounting seat; 3: stator; 4: moving plate; 5: inductor; 6: supporting cover plate; and 7: protective cover plate.

DETAILED DESCRIPTION OF THE EMBODIMENTS

The technical solutions in the embodiments of the present disclosure will be described clearly and completely below in combination with the accompanying drawings of the embodiments of the present disclosure. Apparently, the described embodiments are only part of the embodiments of the present disclosure, but are not all of the possible embodiments. All other embodiments obtained by those of ordinary skill in the art based on the embodiments in the present disclosure without creative work shall fall within the protection scope of the present disclosure.

Figure 2:
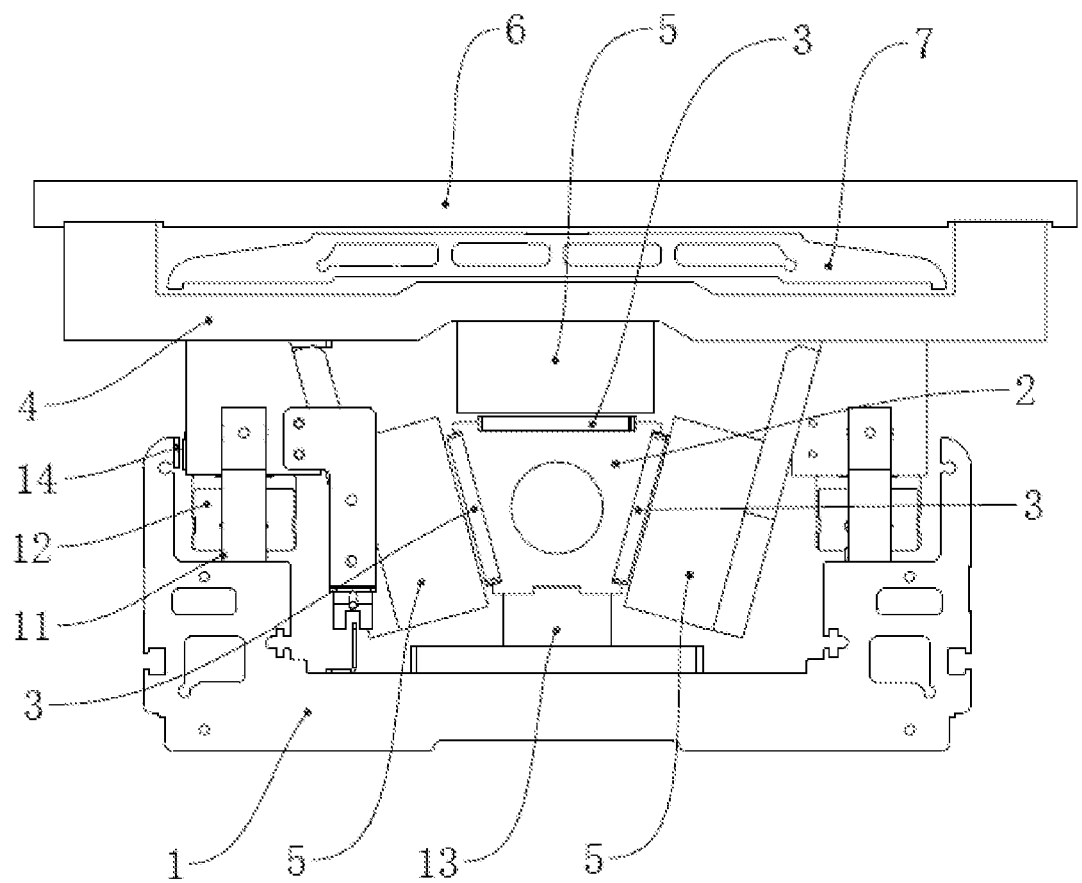
FIG. 2 is a structural schematic diagram II of a specific embodiment of the present disclosure.
Figure 3:
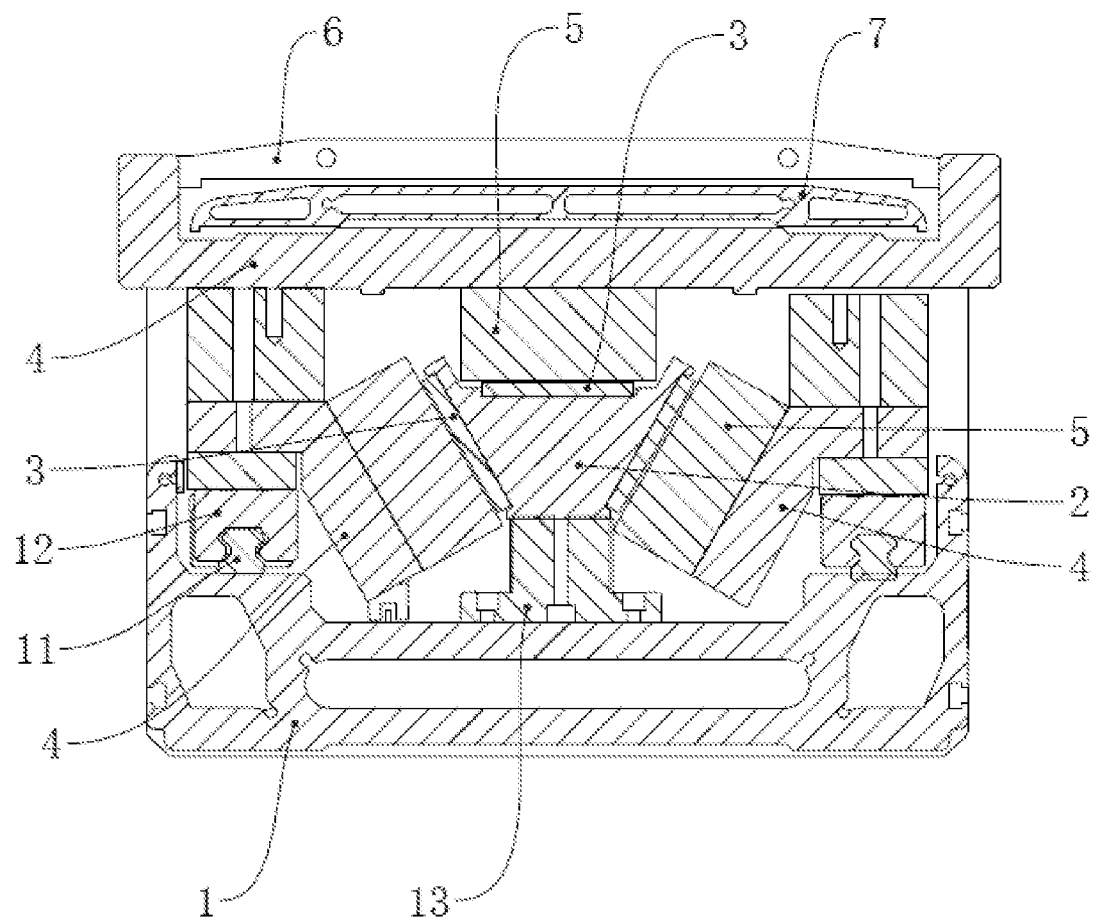
FIG. 3 is a sectional diagram of one specific embodiment of the present disclosure.
Figure 4:
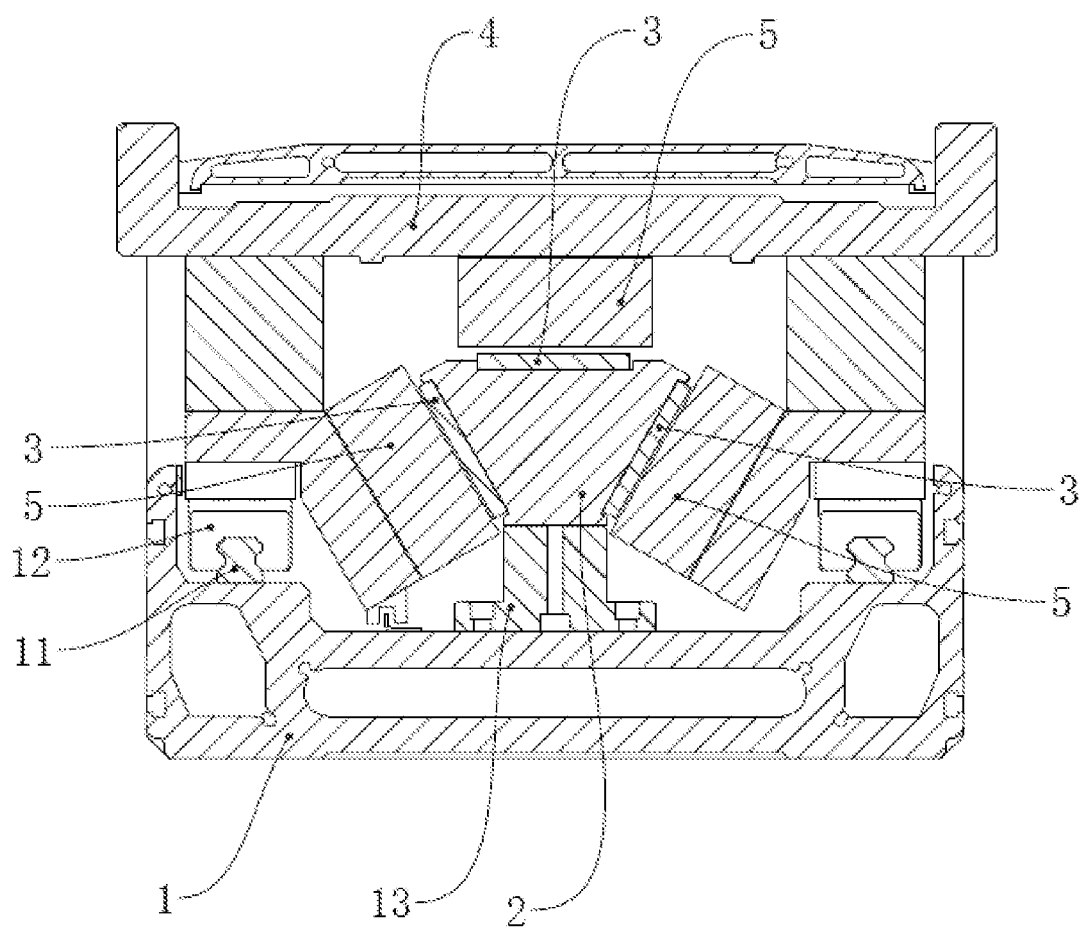
FIG. 4 is a sectional diagram of another specific embodiment of the present disclosure.

As shown in FIG. 1 to FIG. 4, a linear motor module includes a mounting base 1, a magnet mounting seat 2 arranged on the mounting base 1, three stators 3 arranged on the magnet mounting seat 2 and composed of array-structured permanent magnet assemblies, linear guide rails 11 arranged on the mounting seat, sliding blocks 12 mounted on the linear guide rails 11, a moving plate 4 arranged on the sliding blocks 12, and three inductors 5 arranged on the moving plate 4 and corresponding to the stators 3. The magnet mounting seat 2 has three mounting surfaces. The three stators 3 are separately located on the three mounting surfaces. The three inductors 5 are arranged in a one-to-one correspondence to the three stators 3. An angle between two adjacent stators 3 is 60degrees. Each inductor 5 includes an iron core and m phases of concentric windings, and m is an integer greater than or equal to 2. The magnet mounting seat 2 is an inverted trapezoid or an inverted triangle or U-shaped, and the mounting base 1 is provided with a supporting seat 13 fixed to the magnet mounting seat 2.

By using the above technical solution, the angle between two adjacent stators 3 is 60 degrees. As one specific embodiment, that is, the angles between the three mounting surfaces of the magnet mounting seat 2 are 60 degrees, and the inductor 5 on each surface corresponds to each stator 3. In this way, a normal attracting force between the stator 3 and the inductor 5 on each surface can be compensated for each other, and a vector sum of the normal attracting forces tends to be zero. Therefore, the normal attracting force and a load and friction loss on the linear guide rails 11 can be significantly reduced. The normal attracting forces of the three surfaces are forces from the inductors 5 to the stators 3. It can be known from the schematic diagram of the forces, an angle between every two of the normal attracting forces of the three surfaces is 120 degrees, so that the normal attracting forces of the three surfaces can be counteracted. The schematic diagram of the forces shows a common method for analyzing forces, which will not be repeated here. Furthermore, when the magnet mounting seat 2 is U-shaped, the three mounting surfaces include two side surfaces and a U-shaped bottom surface.

As an improved specific implementation, the magnet mounting seat 2 is internally hollow. Each array-structured permanent magnet assembly is composed of several segmented plates.

By using the above technical solution, the magnet mounting seat 2 is hollowed to reduce the weight, and the magnet mounting seat 2 can have a sufficient side surface thickness, to avoid steel saturation of a magnetic flux of the array-structured permanent magnet assemblies.

As an improved specific implementation, an encoder is arranged on the moving plate 4, and the mounting seat is provided with a magnetic scale of encoder 14 opposite to the encoder.

By using the above technical solution, in this way, when the encoder moves with the moving plate 4, the encoder can cooperate with the magnetic scale of encoder 14 to read locations of the sliding blocks 12.

As an improved specific implementation, a supporting cover plate 6 is arranged on the moving plate 4. An accommodating space is formed between the moving plate 4 and the supporting cover plate 6. A protective cover plate 7 is arranged in the accommodating space.

By using the above technical solution, the protective cover plate 7 can be configured to effectively protect the array-structured permanent magnet assemblies, namely, the stators 3, from being affected by dust, and plays a certain protecting role.

The above descriptions are only specific preferred implementation modes of the present disclosure, but the scope of protection of the present disclosure is not limited thereto. For any person skilled in the art, within the technical scope disclosed by the present disclosure, equivalent substitutions or changes made according to the technical solution of the present disclosure and an inventive idea of the present disclosure shall all fall within the scope of protection of the present disclosure.

What is claimed is:

1. A linear motor module, comprising a mounting base, a magnet mounting seat arranged on the mounting base, three stators arranged on the magnet mounting seat and composed of array-structured permanent magnet assemblies, linear guide rails arranged on the mounting seat, sliding blocks mounted on the linear guide rails, a moving plate arranged on the sliding blocks, and three inductors arranged on the moving plate and corresponding to the stators, wherein the magnet mounting seat has three mounting surfaces; the three stators are separately located on the three mounting surfaces; the three inductors are arranged in a one-to-one correspondence to the three stators; and an angle between two adjacent stators is 60 degrees;

wherein the magnet mounting seat includes a top surface adjacent to the moving plate, two side surfaces connected with two opposite sides of the top surface, and a bottom surface adjacent to the mounting base connected between the two side surfaces, the three stators are arranged on the top surface and the two side surfaces respectively, an angle between each side surface and the top surface and an angle between the two side surface are 60 degrees, and a supporting seat is connected between the mounting base and the magnetic mounting seat.

2. The linear motor module according to claim 1, wherein the magnet mounting seat is internally hollow.

3. The linear motor module according to claim 1, wherein each inductor comprises an iron core and m phases of concentric windings, and m is an integer greater than or equal to 2.

4. The linear motor module according to claim 1, wherein each inductor comprises an iron core and m phases of concentric windings, and m is an integer greater than or equal to 2.

5. The linear motor module according to claim 2, wherein each inductor comprises an iron core and m phases of concentric windings, and m is an integer greater than or equal to 2.

6. The linear motor module according to claim 3, wherein an encoder is arranged on the moving plate, and the mounting seat is provided with a magnetic scale of encoder opposite to the encoder.

7. The linear motor module according to claim 4, wherein a supporting cover plate is arranged on the moving plate; an accommodating space is formed between the moving plate and the supporting cover plate; and a protective cover plate is arranged in the accommodating space.

8. The linear motor module according to claim 1, wherein each array-structured permanent magnet assembly is composed of several segmented plates.

* * * * *